US007136678B2

(12) United States Patent
Eiden

(10) Patent No.: US 7,136,678 B2
(45) Date of Patent: Nov. 14, 2006

(54) VIBRATING PORTABLE ELECTRONIC DEVICE, METHOD OF VIBRATING A PORTABLE ELECTRONIC DEVICE AND METHOD OF MESSAGING BY VIBRATING A PORTABLE ELECTRONIC DEVICE

(75) Inventor: Niko Eiden, Helsinki (FI)

(73) Assignee: Nokia Corporation, Espoo (FI)

( * ) Notice: Subject to any disclaimer, the term of this patent is extended or adjusted under 35 U.S.C. 154(b) by 432 days.

(21) Appl. No.: 10/608,771

(22) Filed: Jun. 26, 2003

(65) Prior Publication Data

US 2004/0067780 A1 Apr. 8, 2004

Related U.S. Application Data

(63) Continuation of application No. PCT/FI00/01148, filed on Dec. 27, 2000.

(51) Int. Cl.
*H04M 1/00* (2006.01)
*H04M 3/42* (2006.01)
*G08B 5/22* (2006.01)

(52) U.S. Cl. .................. 455/567; 455/414.1; 455/415; 340/7.6

(58) Field of Classification Search ................ 455/567, 455/414.1, 414.2, 415, 401; 340/7.52, 7.6
See application file for complete search history.

(56) References Cited

U.S. PATENT DOCUMENTS 3,911,416 A 10/1975 Feder
5,436,622 A * 7/1995 Gutman et al. .............. 340/7.6
6,002,927 A 12/1999 Hayes, Jr.
6,160,489 A * 12/2000 Perry et al. .................. 340/7.6
6,211,795 B1 * 4/2001 Izuta ......................... 340/7.52
6,281,785 B1 * 8/2001 Hamaguchi .............. 340/407.1
6,427,815 B1 * 8/2002 Zeller ......................... 188/380
6,574,489 B1 * 6/2003 Uriya ......................... 455/567

FOREIGN PATENT DOCUMENTS

JP 09037322 * 2/1997
JP 09248315 * 9/1997

OTHER PUBLICATIONS

Patent Abstracts of Japan, vol. 1996, No. 2, Feb. 29, 1996 & JP 07 285638 A, Oct. 31, 1995.
Patent Abstracts of Japan, vol. 1999, No. 11, Sep. 30, 1999 & JP 11 165131 A, Jun. 22, 1999.

* cited by examiner

*Primary Examiner*—Duc M. Nguyen
(74) *Attorney, Agent, or Firm*—Ware, Fressola, Van Der Sluys & Adolphson, LLP

(57) ABSTRACT

A portable vibrating device has two electrical motors each having an axle and a weight element coupled to the axle. The axles couple the electrical motors to the weight elements. The weight elements form a weight unit having a total mass m and having a mass center with an offset r in respect to a rotational axis. The weight units are angularly dispositioned to different angular dispositions for varying the amplitude of vibration according to a desired scheme. The angular disposition is controlled by the rotation of the electrical motors. The device may be able to receive messages and to play the by varying the amplitude of vibration accordingly.

20 Claims, 5 Drawing Sheets

VIBRATING PORTABLE ELECTRONIC DEVICE, METHOD OF VIBRATING A PORTABLE ELECTRONIC DEVICE AND METHOD OF MESSAGING BY VIBRATING A PORTABLE ELECTRONIC DEVICE

CROSS-REFERENCE TO RELATED APPLICATION

This application is a continuation of International Application PCT/FI00/01148 having an international filing date of Dec. 27, 2000 published in English Jul. 18, 2002 under International Publication No. WO 02/056272 A1 and from which priority is claimed under all applicable sections of Title 35 of the United States Code including, but not limited to, Sections 120, 363 and 365(c).

BACKGROUND OF THE INVENTION

1. Technical Field

This invention relates to vibrating portable electronic devices, method of vibrating portable electronic devices and method of messaging by vibrating a portable electronic devices.

2. Discussion of Related Art

Vibration is an elegant way to unobtrusively inform a user of a portable device of an event, for example to inform a user of a mobile communications device of an incoming call or message. This vibration is easy to notice even in noisy conditions. Furthermore, a loud alarm signal is not necessary, especially since vibration can be used in combination with an audible alarm signal. In a typical vibrating mobile telephone, the reception of a short message or a telephone call can be indicated by vibration. The vibration is generated by using a miniature-sized electrical motor rotating an unbalanced weight.

The vibration of a portable device has two major parameters: frequency and amplitude of vibration. It is preferred for these parameters to be in a range within which the vibration is easy to detect, especially if the device is carried in a case or in a shoulder bag. Yet the vibration should not be unpleasantly vigorous.

Typically, in mobile telephones, the vibration is used in short pulses of approximately one or more seconds. For each pulse, the unbalanced weight is started and it accelerates to a nominal angular speed and causes the mobile telephone to vibrate. Initially, the unbalanced weight is stationary and it starts to accelerate when an operating voltage is applied to the electrical motor. Therefore, the start is "soft", that is the frequency of the vibration increases and reaches a nominal value corresponding to the nominal angular speed.

In informing the user of an event by an audio alarm signal, the type of event may be indicated by using a different sound, melody, or even voice message. If vibration is used to inform the user of an event, it is difficult to distinguish between different vibrations. To distinguish one type of indication from another, one could alter the duration, the frequency or amplitude of vibration pulses. In each case, however, the change would need to be noticeable. Furthermore, changes in vibration frequency in a vibration pulse could easily feel unpleasant. On the other hand, the amplitude is difficult to vary without changing the frequency. The length of vibration pulses could be altered, but then it is difficult to detect accurately the start of a vibration pulse since the frequency of vibration gradually increases as the motor accelerates until the motor reaches a target angular speed.

Considering the underlying physics, the centrifugal force F causing vibration, for a mass element rotating about a rotational axis is:

$$F=m\omega^2 r$$

wherein m is the mass of the mass element, ω is the angular speed of rotation (radians per second) and r is the offset of the mass element from the rotational axis. As the equation is linear with respect to m and r, the equation can be generalized so that it refers to an infinitely small mass center of a real mass element that is not infinitely small. In this case, the mass m is the mass of the entire mass element and the radius r refers to the offset of the mass center from the rotational axis. The centrifugal force F causes thus a vibration force. Hence, the vibration force giving an amplitude of vibration (which then depends on the mass of the entire device to be vibrated) is linearly proportional to the mass and offset of the mass center, but proportional to the square of the angular speed ($\omega^2$) and, correspondingly, proportional to the square of the frequency of rotation. This explains why the amplitude of vibration is difficult to control by the rotational frequency, when inconvenient vibration frequencies are to be avoided.

In systems in which vibration is caused by rotating a rotatable mass about a rotational axis, one way to change the amplitude of vibration is by changing the rotatable mass to another, heavier or lighter, mass or to offset the rotatable mass further away from, or closer to, the rotational axis. Such operation is inconvenient for an average user of a staple portable device such as a mobile communications device.

DISCLOSURE OF INVENTION

Now a new vibrating portable device and a method of causing a portable device to vibrate has been invented, where the amplitude of the vibration can be controlled.

According to a first aspect of the invention there is provided a vibrating portable electronic device, comprising:

a body;

a driving axle having a rotational axis about which it rotates, the driving axle being rotatably supported by the body;

a weight unit comprising at least one weight element, the weight unit having a total mass m and being coupled to the driving axle for being rotated about the rotational axis of the driving axle, wherein the weight unit has a mass center with an offset r with respect to the rotational axis, so that the vibration of the portable device assumes an amplitude of vibration depending on the product of the offset r and the mass m; and an electrical motor for rotating the driving axle;

characterized in that the electrical motor is adapted to adjust the product of the offset r and the mass m.

Preferably, the weight unit comprises at least two weight elements. Preferably, the electrical motor is adapted to adjust the angular disposition of the weight elements in order to change the offset r. By adjusting the offset r, the vibration of the device can be rapidly altered to and maintained on a desired level. This allows the vibration to be synchronized with a music signal or an audible informing signal.

Preferably, the weight elements are on a same axial side with regard to the electrical motor. By positioning all the weight elements on the same axial side of the electrical motor, the device is simpler to construct. Alternatively, the weight unit comprises a weight element on each side of the electrical motor (in the axial direction).

Preferably, the electrical motor is adapted to adjust the product responsive to at least one electrical signal. This at least one electrical signal may be, for example, a ringing tone signal, an alarm signal, a notification signal, or a messaging signal.

Preferably, the electrical motor is capable of adjusting the product automatically. This allows automatic selection of desired vibration amplitude in accordance with a criterion, such as the type of vibration signal to be given.

Preferably, the device further comprises another electrical motor and a separate driving axle for the another electrical motor. Either of the two electrical motors is adapted to use its driving axle in order to rotate at least one weight element. Furthermore, the device preferably comprises a controller for controlling the operation of the electrical motors. The controller is adapted to adjust the angular disposition of the weight elements by controlling the rotation of at least one electrical motor so that the weight elements can be rotated in to a desired relative angular relationship.

Advantageously, the vibrating portable device allows easy adjustment of the vibration amplitude without necessarily requiring use of any physical tools.

Preferably, the electrical motor is capable of adjusting the product substantially down to zero. Preferably, this is carried out by balancing the weight unit so that the offset r becomes practically zero, that is the mass centre is set on the rotational axis. By reducing the product practically to zero, the electrical motor can be accelerated to its operational angular speed without the user feeling any vibration during such an acceleration phase. By increasing the product of the offset r and the mass m after the electrical motor has substantially reached its target angular speed, the vibration of the portable device with a substantially constant frequency can be started rapidly.

Preferably, the weight elements have a common rotational axis and face each other. This allows positioning of the weight elements in substantially the same space within the body.

Preferably, the device further comprises means for allowing the weight elements to move with respect to each other in order to adjust the offset r.

Preferably, the means for allowing the weight elements to move with respect to each other is adapted to turn the weight elements to a different angular disposition about the rotational axis and with respect to each other. This allows a relatively straightforward implementation of a vibration amplitude adjustable device.

Preferably, the device further comprises a resilient member for forming an angular torsion force that tries to change the angular disposition of the weight elements with respect to each other to a first angular direction. The torsion force depends on the amount of angular disposition and corresponds to the angular disposition. Even more preferably, the controller is adapted to adjust the rotating power of the electrical motors so that a desired difference in rotating forces forms which is equal to the angular force at a desired amount of the angular disposition. (The rotating power is the product of the rotation speed and rotating force). When the second electrical motor runs, the weight elements assume a second, different angular disposition, causing a second product of the offset r and the mass m. The second product differs from the first product.

Advantageously, the resilient member facilitates continuous and smooth adjustment of the product of the offset r and the mass m within a desired range while the weight unit is rotating. This provides various advantages, such as adjusting the product to change the amplitude of vibration thus allowing indication of different vibration signals to a user.

In an alternative embodiment of the invention, two different angular dispositions of weight elements are realized by choice of one of the electrical motor to be electrically driven. In a first case, only one of the electrical motors is electrically driven in the first angular direction so that it drives mechanically the weight unit and the other electrical motor. The other electrical motor causes a friction force that makes the weight elements assume a first angular disposition with respect to each other. In a second case, the other electrical motor is electrically driven in the first angular direction for mechanically driving the weight unit and the other electrical motor. The mechanically driven electrical motor causes a friction force that effects in the same angular direction as the resilient member so that the weight elements assume a second angular disposition with respect to each other.

The device allows accelerating first the weight unit substantially to its operating angular speed and after that switching on the vibration so that the vibration immediately starts with a substantially constant amplitude and frequency.

According to a second aspect of the invention a method is provided for vibrating a portable electronic device comprising the steps of:

- providing the device with a weight unit having a mass m and a mass center;
- providing the device with a driving axle and an electrical motor;
- coupling the electrical motor, driving axle and weight unit;
- rotating the weight unit around a rotational axis by the electrical motor using the driving axle;
- positioning the mass center at an offset r with respect to the rotational axis for vibrating the device with an amplitude depending on the product of the offset r and the mass m;
- characterized in that the method further comprises the step of: adjusting the product of the offset r and the mass m by the electrical motor rotating the weight unit.

Preferably, the said adjusting occurs during the rotation of the weight unit. Even more preferably, the adjusting occurs in response to a triggering event selected from a group consisting of the following: the rotation speed of the weight unit changing to a predetermined level, the rotation speed of the weight unit changing, a change in a melody being played by the portable electronic device, receiving a message, receiving a message from a particular sender, receiving a particular type of message, reaching a time of day, and reaching a date.

According to a third aspect of the present invention there is provided a method of messaging by vibrating a portable electronic device having coupled an electrical motor, a driving axle and a weight unit having a mass m with a mass center; the method comprising the steps of:

- receiving a message;
- rotating the weight unit around a rotational axis by the electrical motor using the driving axle;
- positioning the mass center at an offset r with respect to the rotational axis for vibrating the device with an amplitude depending on the product of the offset r and the mass m;
- characterized in that the method further comprises the step of: adjusting in accordance with the message the product of the offset r and the mass m by the electrical motor rotating the weight unit.

The method of messaging allows for sending "vibration messages", that is to communicate by means of vibration. The sender can, for example, formulate a message containing a code "vibrate 1" or "vibrate 2" to indicate the type of vibration to be carried out by a receiving device. When the message is transmitted to the receiving device, its user becomes aware of the content of the message by means of the vibration specific for this type of message.

Preferably, the different vibration messages distinguish by at least one of the following factors: the pace of the vibration ("rhythm"), the frequency of vibration during vibration, and the amplitude of vibration during vibration. Preferably, at least one of the frequency and the amplitude is varied during the playing of the vibrating message.

The present invention is applicable to be used in various kinds of portable electronic devices. These include mobile telephones (cellular telephones, wireless telephones, satellite telephones) and gaming devices such as vibrating joysticks and steering wheels for providing a more natural response to different events of games. Generally speaking, the invention can be used in devices the use of which requires providing a user either with mechanical feedback of an event occurring or with a mechanical notification of an event occurring.

BRIEF DESCRIPTION OF THE DRAWING

The invention will now be described, by way of example only, with reference to the accompanying drawings, in which.

BEST MODE FOR CARRYING OUT THE INVENTION

Next, an introduction follows before a thorough description of a system according to a preferred embodiment of the invention. The system is an example according to a first aspect of the invention and it implements the method of a second aspect of the invention. The third aspect of the invention, messaging with adjusting the vibration is explained later with reference to FIG. 9.

Figure 1:
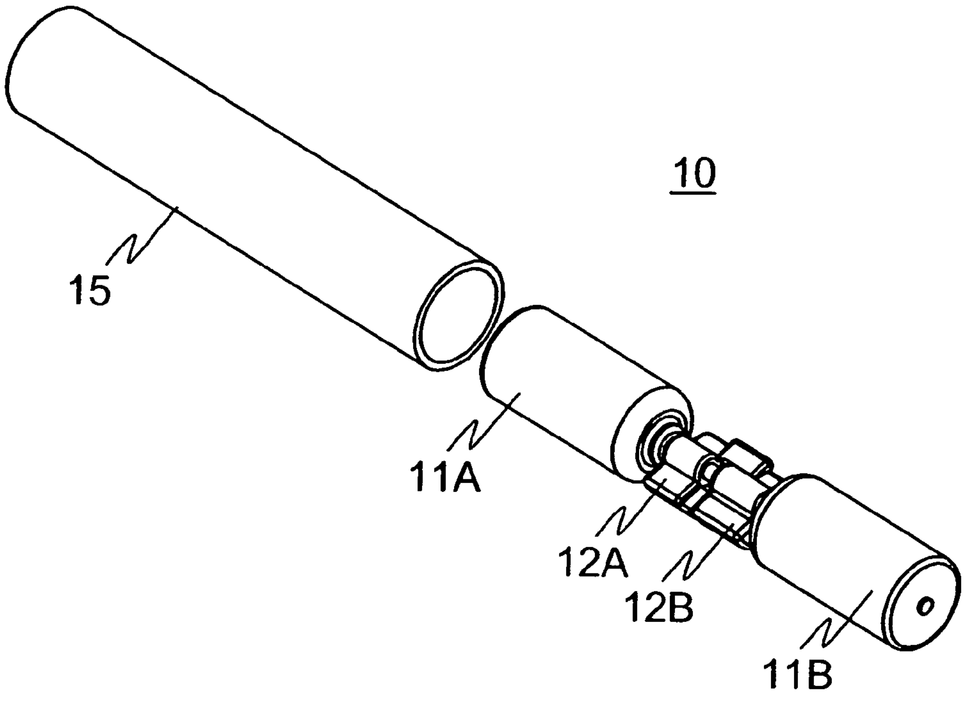
FIG. 1 shows a system for causing vibration in a first configuration, according to a preferred embodiment of the invention.

FIG. 1 shows a system 10 for causing vibration in a first configuration, according to a preferred embodiment of the invention. The system comprises a first electrical motor 11A, a second electrical motor 11B, a first weight element 12A, a second weight element 12B and a tubular housing 15 for accommodating the aforementioned components. FIG. 1 illustrates the system in a disassembled form, where the components have been removed from the housing 15. When the system is assembled, the two electrical motors 11A and 11B are coaxially supported by the housing 15 and separated such that the weight elements 12A and 12B fit rotatably between them. The weight elements 12A and 12B have a similar basic shape. Their diameter is approximately 5 to 20 mm and their length is few millimeters. The weight elements are driven about a common rotational axis by their respective electrical motors and can rotate in relation to each other. In the preferred embodiment the weight elements can rotate in relation to each other to a limited extent, as will be described in more detail with reference to FIGS. 2 and 3. In this first configuration, the first and second weight elements 12A and 12B are both generally aligned on the same side of their common rotational axis so that together they form an unbalanced weight unit.

Figure 2:
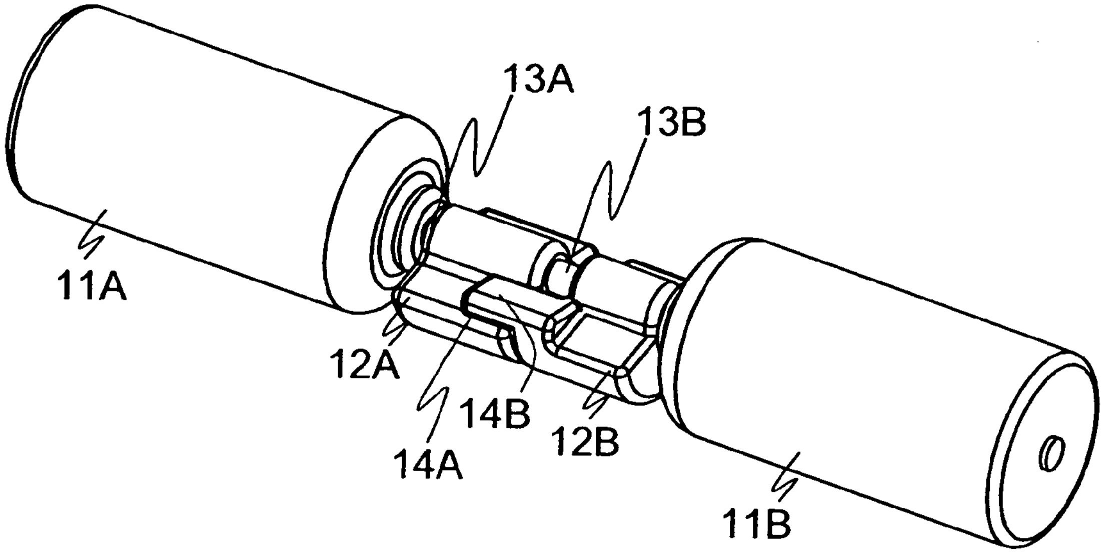
FIG. 2 shows another view of the system of FIG. 1 in the first configuration.
Figure 3:
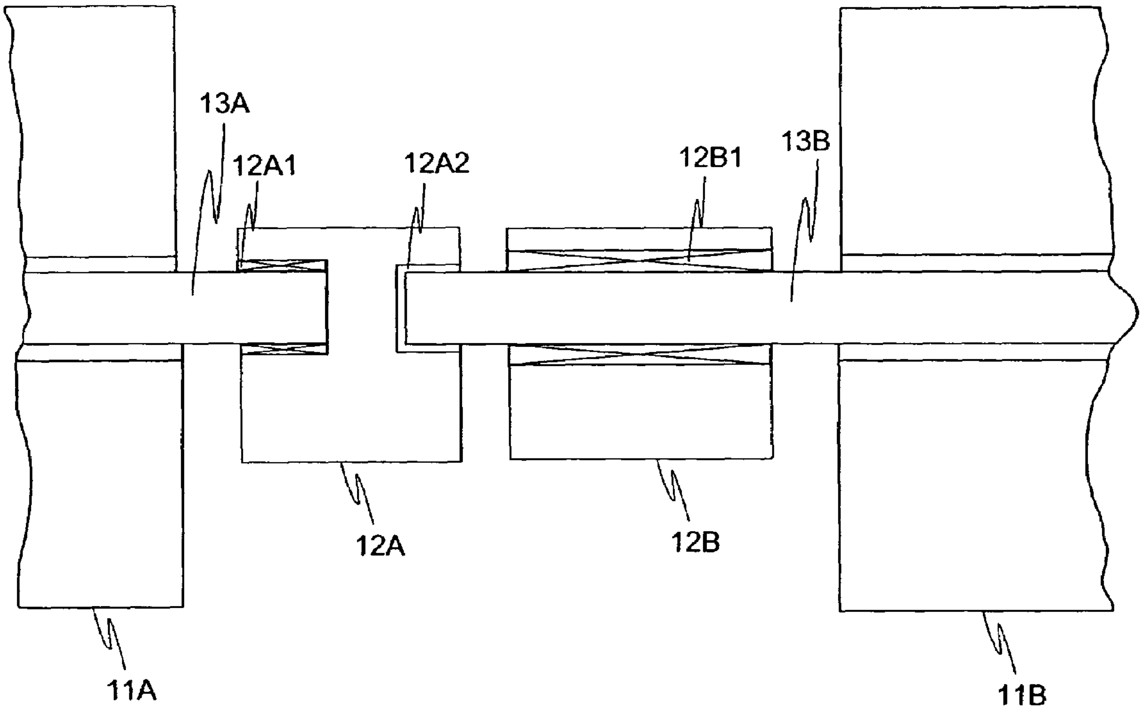
FIG. 3 shows a detailed view of the system of FIG. 2.

FIG. 2 shows another view of the system of FIG. 1 in its first configuration. The housing 15 is not shown. FIG. 3 shows a detailed view of the system of FIG. 2. The system is next described with reference to FIGS. 2 and 3. In an axial direction from left to right along the common rotational axis there is the first electrical motor 11A, the first axle 13A, the first weight element 12A, the second axle 13B, the second weight element 12B and the second electrical motor 11B. The first axle 13A extends out of the first electrical motor 11A and fits into a first hole 12A1 in the first weight element. The first axle 13A is keyed to the first weight element 12A so that the first weight element 12A can be rotated by the first electrical motor 11A using the first axle 13A. The second axle 13B extends out of the second electrical motor 11B and passes through a conduit 12B1 of the second weight element 12B, extends cross a gap between the weight elements 12A,12B and is received as a close fit by a second hole 12A2 in the first weight element. The second axle 13B is keyed to the second weight element 12B, but free to rotate within the second hole 12A2.

The first and second holes 12A1, 12A2 are coaxial with the rotational axis of the weight elements and the axles 13A,13B. The holes support the ends of the axles 13A, 13B. This reduces mutual movement of the weight elements 12A,12B and thus also reduces their abrasion.

The first weight element 12A has a pocket 14A spaced from the rotational axis. The second weight element 12B has a lug 14B that overlaps with the first weight element in the direction of the rotational axis. In the first configuration, the pocket 14A receives the lug 14B. When the lug 14B engages the pocket 14A, the first weight element 12A is able to turn in relation to the second weight element 12B in one angular direction approximately 180° (from the first configuration to a second configuration) but not at all in the opposite angular direction.

Figure 4:
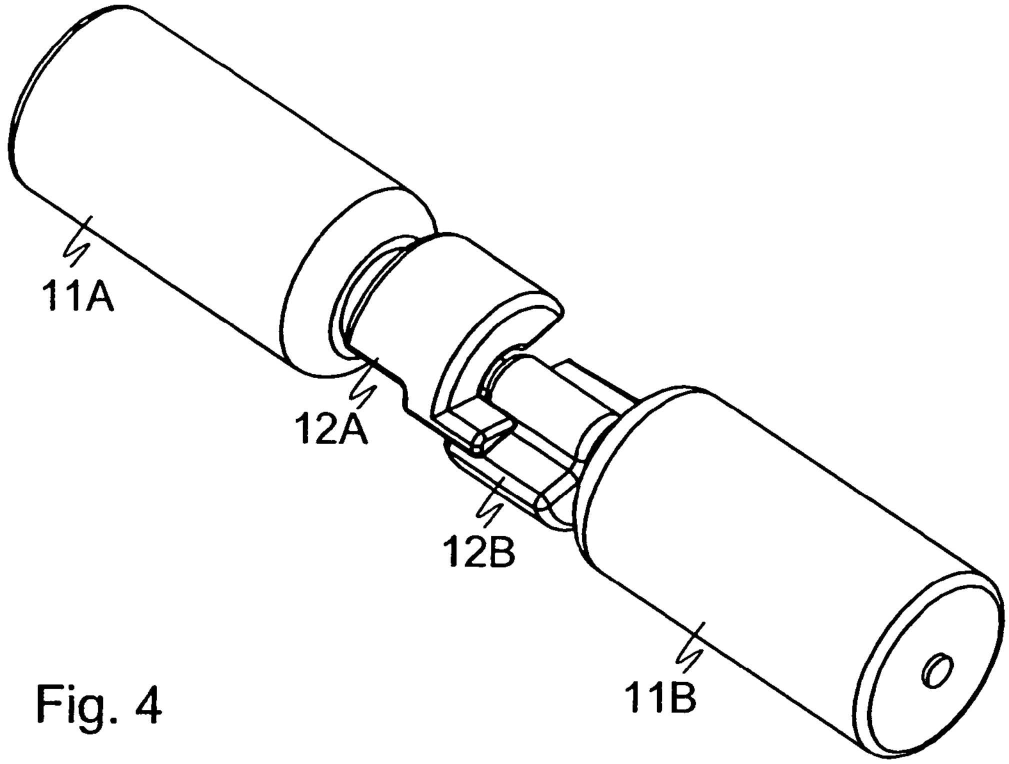
FIG. 4 shows a detailed view of the system of FIG. 1 in a second configuration.

FIG. 4 shows a detailed view of the system of FIG. 1 in a second configuration. The first and second weight elements 12A and 12B are basically aligned on opposite sides of their common rotational axis. Thus the weight unit formed of the weight elements is well balanced and the rotation of the weight unit does not cause practically any vibration.

Figure 5:
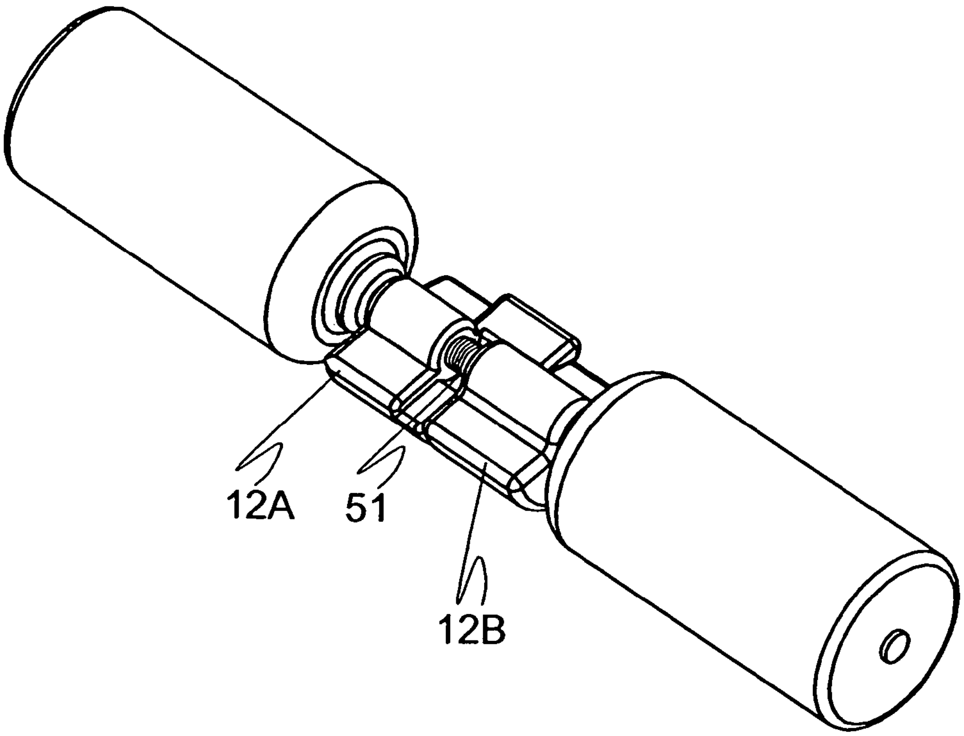
FIG. 5 shows system according to an embodiment of the invention.

FIG. 5 shows a system according to an embodiment of the invention. The system is a refinement of the embodiment shown in FIG. 2 as it additionally contains a torsion spring 51 (a helical steel spring) between the weight elements 12A,12B. The torsion spring 51 forms a resilient and angular torsion force that tries to change angular disposition of the weight elements 12A,12B with respect to each other in a first angular direction. The magnitude of the torsion force depends on the amount of the angular disposition of the weight elements. The weight elements 12A,12B continually try to settle in such an angular disposition, in which the torsion force equals to the difference in the rotating forces. Hence, the angular disposition of the weight elements 12A, 12B can be continually adjusted to and maintained on a desired level by controlling the rotating power of the electrical motors so that a difference in rotating forces equals to the torsion force at the desired angular disposition of the weight elements. The angular disposition can be freely adjusted within a range in which the weight elements 12A,12B can move angularly with respect to each other. The torsion spring allows stepless and smooth control of the amplitude of vibration.

The appropriate difference in rotating forces depends on the stiffness of the torsion spring 51. If the friction in each electrical motor is the same, then the difference in electrical powers fed to the electrical motors linearly corresponds to the difference in rotating forces.

In yet another alternative embodiment, either the first or second electrical motor is electrically driven. The other electrical motor is not electrically driven. Regardless of that which electrical motor is driven, the weight elements 12A, 12B are rotated in the same angular direction. The electrical motor not driven brakes the weight element connected to it because the electrical motors always have some internal friction. Depending on the selection of the electrical motor to be used, the weight unit assumes either the first or second configuration. The torsion spring assists the transition from one configuration to another and hinders the transition in the opposite angular direction. The torsion spring 51 is only used to accelerate transition between the two configurations. In one yet another alternative embodiment the selection of electrical motor is also used, but the device is constructed without the torsion spring 51. In that case, the transition from one angular disposition is slower in one angular direction, but faster in the opposite angular direction.

When the angular disposition of weight elements is adjusted by the selection of electrical motor used for driving the weight elements, the freedom of selection of the vibration amplitude is reduced.

Figure 6:
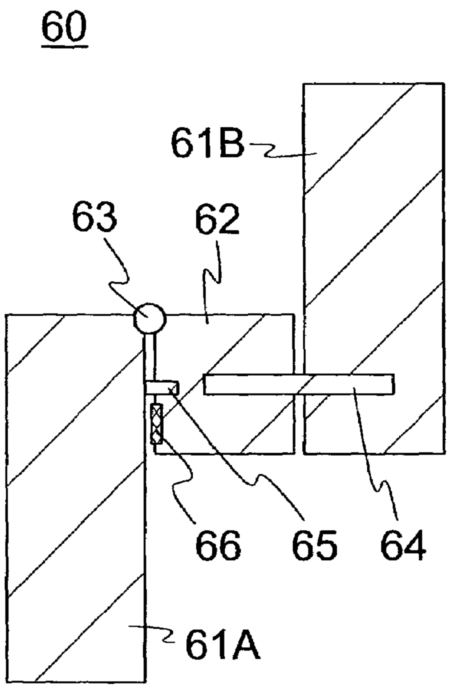
FIG. 6 shows a cross-section against a rotational axis of a weight unit in a first configuration, according to an alternative embodiment of the present invention.

FIG. 6 shows a cross-section against a rotational axis of a weight unit in a first configuration, according to an alternative embodiment of the present invention. The weight unit 60 comprises two steel-made weight elements having a rectangular cross-section. A first weight element 61A has been rotatably attached by a hinge 63 to an axle 62. The cross-section of the axle 62 is square. The first weight element 61A is positioned so that a side of the first weight element covers a first side of the axle. A second weight element 61B is fixed to the axle 62 on a side opposite to the first side, for example by a pin 64. A screw 65 is located at a distance from the hinge 63 and turned to the first side of the axle so that its head protrudes from the side of the axle. The head of the screw 65 causes a gap between the first weight element 61A and the first side of the axle 62.

A magnet 66 is fixed next to the screw 65 so that it exerts a magnetic force on the first weight element 61A to draw it towards the axle 62 about the hinge 63. The screw is used for adjusting the magnetic force to a desired level. In an alternative embodiment, the axle 62 may be magnetized.

Figure 7:
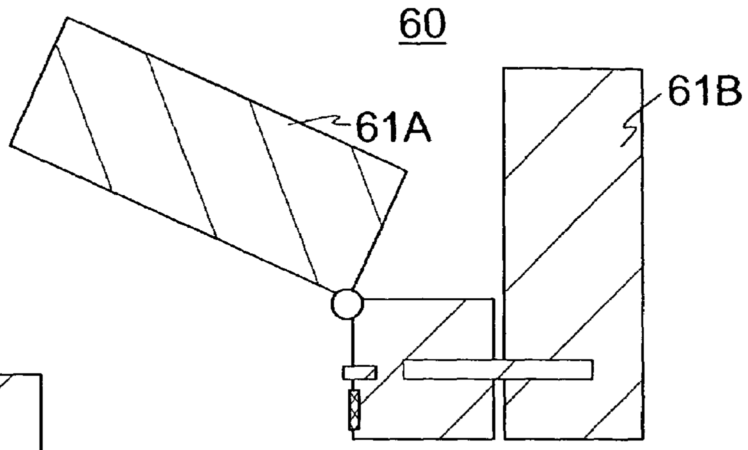
FIG. 7 shows the system of FIG. 6 in a second configuration.

The weight unit is rotated by an electrical motor using the axle 62 in an angular direction (counter clockwise in FIG. 6) such that deceleration of the weight unit 60 tries to turn the first weight element about the hinge 63 against the screw 65. When the weight unit rotates with the axle 62, centrifugal force is applied to the weight elements. The second weight element 61B is fixed to the axle so that it cannot move in relation to the axle 62. Although the first weight element 61A can move about the hinge 63, it stays in contact with the screw 63 as long as the magnetic force exceeds the centrifugal force effecting to the magnet 66. However, when the centrifugal force effecting to the magnet exceeds the magnetic force, the weight unit assumes its second configuration, shown in FIG. 7, wherein the first element turns so that its weight center settles as far from the rotational axis as possible. At the same time, the weight unit becomes unbalanced and starts to cause vibration.

If a braking force is applied to the axle 62 (for example by the electrical motor), the first weight element 61A experiences a turning force about the hinge 63. The turning force moves the first element 61A about the hinge 63 and against the head of the screw 65. Then the first element 61A becomes again held in place by the magnet 66 so that the weight unit is again in the first configuration.

Regarding all the embodiments of the invention, when the product of the offset r and the mass rapidly increases, the power required by an electrical motor rotating the weight unit increases and the angular speed of the weight unit tends to drop. Therefore, it is advantageous to compensate for this effect by supplying an increased electrical power to the electrical motor in order to maintain a substantially constant angular speed. Alternatively, the weight unit is initially accelerated to an angular speed sufficiently excessive to a target angular speed so that the change in the product of the offset r and the mass causes the angular speed of the weight unit to decrease until it reaches the target angular speed. The initial angular speed required can either be calculated or determined empirically.

Figure 8:
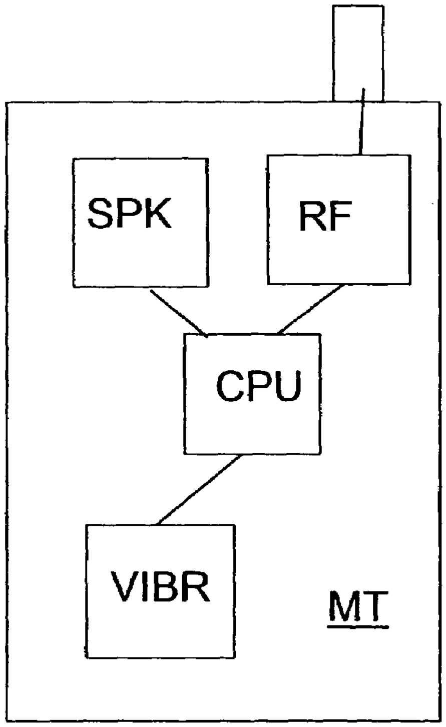
FIG. 8 shows a block diagram of a mobile telephone comprising a system for causing vibration according to a preferred embodiment of the invention.

FIG. 8 shows a block diagram of a mobile telephone MT comprising a system 10 for causing vibration according to a preferred embodiment of the invention. The mobile telephone MT further comprises a radio block RF for wireless communications with a mobile communications network (not shown) and a speaker SPK for playing different ringing tones, clock alarms, calendar reminder sounds, indication sounds or melodies for informing a user of an incoming message such as a short message, a facsimile message or electronic mail. Additionally, the mobile telephone MT comprises a central processing unit CPU for controlling its operation. The CPU controls the system 10 to make it generate vibration in appropriate circumstances. These circumstances include the following: a change in a melody being played by the mobile telephone MT, receipt of a message, receipt of a particular type of message and the time of day or date reaching a predefined alarm time or date. The mobile telephone MT may be capable of playing music through the speaker SPK. In this case, the vibration can be synchronized with the music being played though the speaker SPK.

Figure 9:
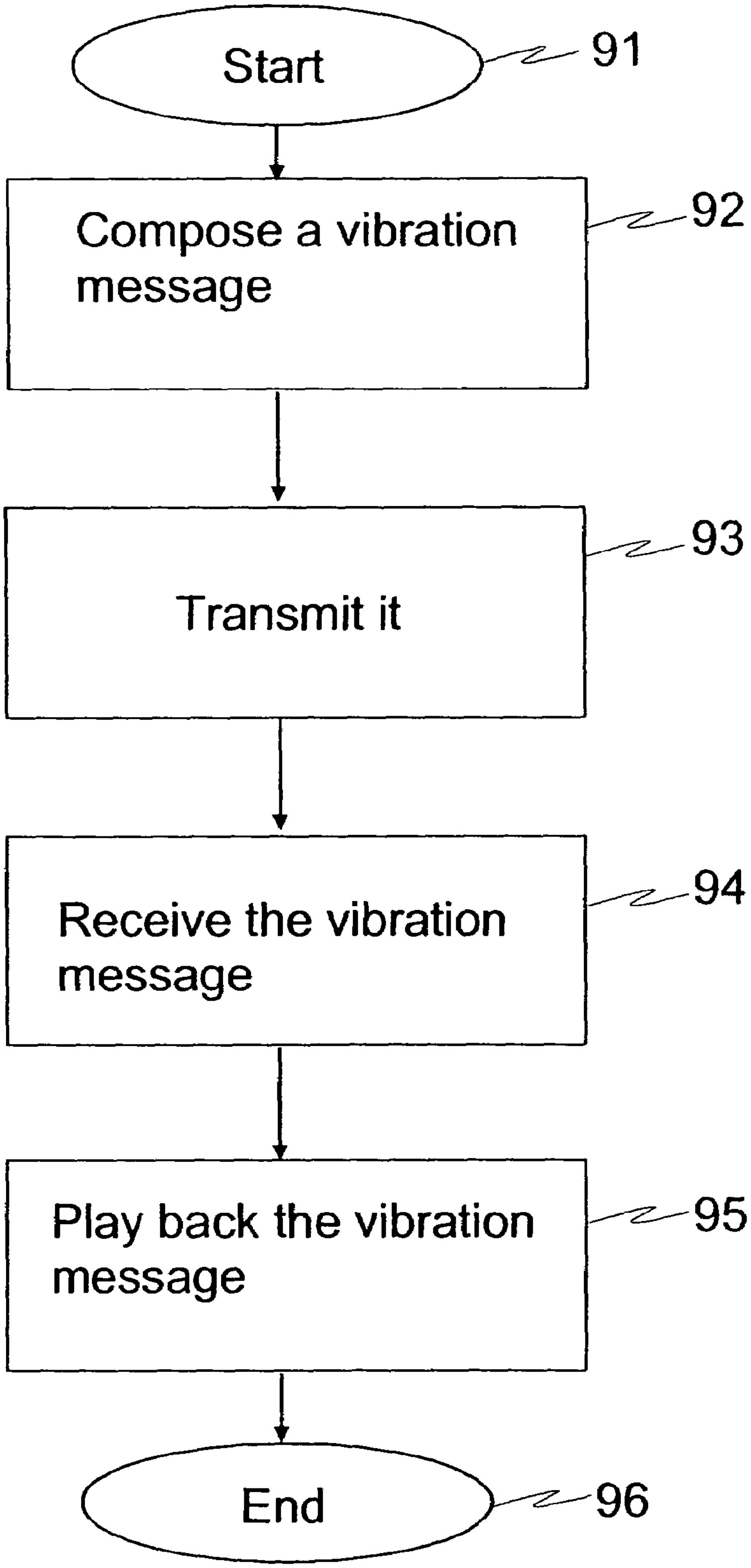
FIG. 9 shows a messaging process according to an aspect of the invention.

FIG. 9 shows a messaging process according to an aspect of the invention. In the messaging process, vibration messages are generated and played with a mobile telephone MT shown in FIG. 8. These messages can be handled by a telecommunications network as ordinary text messages, such as the Short Message Service in Global System for Mobile Communications (GSM). The process contains the following main steps: start (block 91), composing a vibration message to be sent (block 92), transmitting the vibration message (block 93), receiving the vibration message by a recipient of the message (block 94), playing it (that is, for causing vibration according to the message) (block 95) and end (block 96). In the process, a scheme is agreed between a message sender and receiver to map different messages with different vibration tunes. The term vibration tune refers to a continuous vibration or a series of vibrations. It can have variations in vibration frequency and amplitude. Changes in amplitude may be sufficiently large that a receiver of the tune is able to feel changes in the character of the vibration or vibrations so that the vibration feels discontinuous, for example, mimicking a rhythm of a musical melody. Hence, the vibration may form beats corresponding to the rhythm of the melody.

The agreed scheme can be customized by the user or pre-set, for example, at a factory, when the mobile telephone is being manufactured. For example, a message containing a code "vibrate 1" may refer to a happy vibration tune ("good" vibrations), corresponding to a melody of a song. It may be sent by one individual to another individual as a good luck message. Alternatively, an individual might send an angry or apologetic vibration message. The message causing this might be a text message containing a code "vibrate 2". When the message is received by a mobile telephone of FIG. 8, its user becomes aware of the content of the message by means of the vibration specific for this type of message.

The different vibration messages, or tunes, distinguish by at least one of the following factors: the pace of the vibration ("rhythm", that is discrete instances of vibration separated by instances of no vibration or noticeably less vibration), vibration frequency (motor speed), and the amplitude of vibration during vibration. In this embodiment, at least one of the pace and amplitude of vibration are varied during the playing of the vibrating message.

In yet another alternative embodiment, different types of vibration notifications are used to draw a user's attention to a reminder. In this case, the different types of notifications (such as clock alarm, meeting reminder, phone call reminder) can be mapped to different vibration tunes. This allows a user to recognize the reminder based on the type of vibration he feels.

Particular implementations and embodiments of the invention have been described. It is clear to a person skilled in the art that the invention is not restricted to details of the embodiments presented above, but that it can be implemented in other embodiments using equivalent means without deviating from the characteristics of the invention. The scope of the invention is only restricted by the attached patent claims.

The invention claimed is:

1. A vibrating portable electronic device, comprising:
- a body;
- a driving axle having a rotational axis about which it rotates, the driving axle being rotatably supported by the body;
- a weight unit comprising at least two weight elements, the weight unit having a total mass m and being coupled to the driving axle for being rotated about the rotational axis of the driving axle;
- wherein the weight unit has a mass center with an offset r with respect to the rotational axis, so that the vibration of the portable device assumes an amplitude of vibration depending on the product of the offset r and the mass m;
- an electrical motor for rotating the driving axle, and is adapted to adjust the product of the offset r and the mass m;
- wherein the electrical motor is adapted to adjust the angular disposition of the at least two weight elements in a first angular direction in order to change the offset r to a desired level within a predetermined range; and
- wherein the device further comprises a member for forming a force that tries to change said adjusted angular disposition of the weight elements in a second angular direction opposite to the first angular direction in order to maintain the offset r on said desired level within said predetermined range.

2. A vibrating portable electronic device according to claim 1, wherein the weight elements are on a same axial side with regard to the electrical motor.

3. A vibrating portable electronic device according to claim 1, in that the weight unit comprises a weight element on each side of the electrical motor.

4. A vibrating portable electronic device according to claim 1, further comprising another electrical motor and a separate driving axle for the another electrical motor.

5. A vibrating portable electronic device according to claim 4, preferably comprising a controller for controlling the operation of the electrical motors.

6. A vibrating portable electronic device according to claim 5, wherein the controller is adapted to adjust the rotating power of the electrical motors so that a desired difference in rotating forces forms equal to the torsion force at the desired amount of the angular disposition.

7. A vibrating portable electronic device according to claim 1, wherein the electrical motor is capable of adjusting the product substantially down to zero.

8. A vibrating portable electronic device according to claim 1, wherein the weight elements have a common rotational axis and face each other.

9. A vibrating portable electronic device according to claim 1, further comprising means for allowing the weight elements to move with respect to each other in order to adjust said offset r.

10. A vibrating portable electronic device according to claim 9, wherein the means for allowing the weight elements to move with respect to each other is adapted to turn the weight elements to a different angular disposition about the driving axle and with respect to each other.

11. A vibrating portable electronic device according to claim 1, further comprising a resilient member for forming an angular torsion force that tries to change the angular disposition of the weight elements with respect to each other to a first angular direction.

12. A vibrating portable electronic device according to claim 1, wherein two different angular dispositions of weight elements are realized by choice of a running electrical motor among two electrical motors.

13. A vibrating portable electronic device according to claim 1, wherein the electrical motor is adapted to adjust the product responsive to at least one electrical signal.

14. A vibrating portable electronic device according to claim 13, wherein the electrical signal is selected from a group consisting of: a ringing tone signal, an alarm signal, a notification signal, or a messaging signal.

15. A method comprising:
- providing a portable electronic device with a weight unit having a mass m and a mass center;
- providing the device with a driving axle and an electrical motor;
- coupling the electrical motor, driving axle and weight unit;
- rotating the weight unit around a rotational axis by the electrical motor using the driving axle;
- positioning the mass center at an offset r with respect to the rotational axis for vibrating the device with an amplitude depending on the product of the offset r and the mass m;

adjusting the product of the offset r and the mass m by the electrical motor rotating the weight unit in a first angular direction, in order to change the offset r to a desired level within a predetermined range; and forming a force by a member that tries to change the angular disposition of the weight unit in a second angular direction opposite to the first angular direction in order to maintain the offset r on said desired level within said predetermined range.

16. A method according to claim 15, wherein said adjusting occurring during the rotating of the weight unit.

17. A method according to claim 16, wherein the adjusting occurring in response to a triggering event selected from a group consisting of the following: the rotation speed of the weight unit changing to a predetermined level, the rotation speed of the weight unit changing, a change in a melody being played by the portable electronic device, receiving a message, receiving a message from a particular sender, receiving a particular type of message, reaching a time of day, and reaching a date.

18. A method, comprising:

receiving a message;

rotating a weight unit having a mass m with a mass center around a rotational axis by an electrical motor using a driving axle;

positioning the mass center at an offset r with respect to the rotational axis for vibrating a portable electronic device with an amplitude depending on the product of the offset r and the mass m;

adjusting in accordance with the message the product of the offset r and the mass m by the electrical motor rotating the weight unit in a first angular direction, in order to change the offset r to a desired level within a predetermined range; and forming a force by a member that tries to change the angular disposition of the weight unit in a second angular direction opposite to the first angular direction in order to maintain the offset r on said desired level within said predetermined range.

19. A vibrating portable electronic device, comprising:

a body;

a driving axle having a rotational axis about which it rotates, the driving axle being rotatably supported by the body;

a weight unit comprising at least one weight element, the weight unit having a total mass m and being coupled to the driving axle for being rotated about the rotational axis of the driving axle;

wherein the weight unit has a mass center with an offset r with respect to the rotational axis, so that the vibration of the portable device assumes an amplitude of vibration depending on the product of the offset r and the mass m;

an electrical motor for rotating the driving axle; and adapted to adjust the product of the offset r and the mass m;

wherein the device further comprises another electrical motor and a separate driving axle for the another electrical motor;

wherein the device further comprises a controller for controlling the operation of the electrical motors; and wherein the controller is adapted to adjust the rotating power of the electrical motors so that a desired difference in rotating forces forms equal to the torsion force at the desired amount of the angular disposition.

20. A vibrating portable electronic device, comprising:

a body;

a driving axle having a rotational axis about which it rotates, the driving axle being rotatably supported by the body;

a weight unit comprising at least two weight elements, the weight unit having a total mass m and being coupled to the driving axle for being rotated about the rotational axis of the driving axle;

wherein the weight unit has a mass center with an offset r with respect to the rotational axis, so that the vibration of the portable device assumes an amplitude of vibration depending on the product of the offset r and the mass m;

an electrical motor for rotating the driving axle; and adapted to adjust the product of the offset r and the mass m; and wherein two different angular dispositions of weight elements are realized by choice of a running electrical motor among two electrical motors.

* * * * *